(12) United States Patent
Matsuura

(10) Patent No.: US 8,789,982 B2
(45) Date of Patent: Jul. 29, 2014

(54) LIGHT SOURCE DEVICE AND MANUFACTURING METHOD THEREOF

(71) Applicant: Brother Kogyo Kabushiki Kaisha, Nagoya (JP)

(72) Inventor: Taizo Matsuura, Aichi-Ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 3 days.

(21) Appl. No.: 13/792,394

(22) Filed: Mar. 11, 2013

(65) Prior Publication Data
US 2013/0188363 A1   Jul. 25, 2013

Related U.S. Application Data

(62) Division of application No. 12/412,805, filed on Mar. 27, 2009, now Pat. No. 8,414,730.

(30) Foreign Application Priority Data

May 29, 2008   (JP) ................................ 2008-140811

(51) Int. Cl.
*F21V 17/10*   (2006.01)

(52) U.S. Cl.
USPC .................................................. 362/311.01

(58) Field of Classification Search
USPC ........... 156/379.6; 362/257, 277, 418, 311.01
See application file for complete search history.

(56) References Cited

U.S. PATENT DOCUMENTS

| 6,928,100 | B2 | 8/2005 | Sato et al. |
| 7,349,166 | B2 | 3/2008 | Sakai et al. |
| 2002/0075916 | A1* | 6/2002 | Sato et al. ........................ 372/36 |
| 2006/0062139 | A1* | 3/2006 | Oozeki et al. ................. 369/300 |
| 2006/0077575 | A1* | 4/2006 | Nakai et al. ................... 359/819 |
| 2007/0145254 | A1* | 6/2007 | Chen ............................. 250/239 |
| 2007/0183273 | A1* | 8/2007 | Arai et al. .................. 369/44.11 |
| 2010/0067351 | A1* | 3/2010 | Yabe et al. ............... 369/112.23 |

FOREIGN PATENT DOCUMENTS

| JP | 4-152316 A | 5/1992 |
| JP | 04143929 A * | 5/1992 |
| JP | 10-090622 A | 4/1998 |
| JP | 10-123385 | 5/1998 |
| JP | 2001-056425 | 2/2001 |
| JP | 2003-029186 A | 1/2003 |
| JP | 2003-255246 A | 9/2003 |
| JP | 2004-163463 | 6/2004 |
| JP | 2005-201973 A | 7/2005 |
| JP | 2007-183414 A | 7/2007 |
| WO | WO 2008065783 A1 * | 6/2008 |

OTHER PUBLICATIONS

JP Office Action dtd Sep. 28, 2010, JP Appln. 2008-140811, partial English Translation.
Machine translation of JP 10123385 A, May 15, 1998.

* cited by examiner

*Primary Examiner* — Daniel McNally
(74) *Attorney, Agent, or Firm* — Banner & Witcoff, Ltd.

(57) ABSTRACT

A light source device is provided, which includes: a hold member; a light source held by the hold member; an optical element held by the hold member; and a hardened first adhesive agent bonding at least one of the light source and the optical element to the holding member. The hardened first adhesive agent has elasticity.

5 Claims, 8 Drawing Sheets

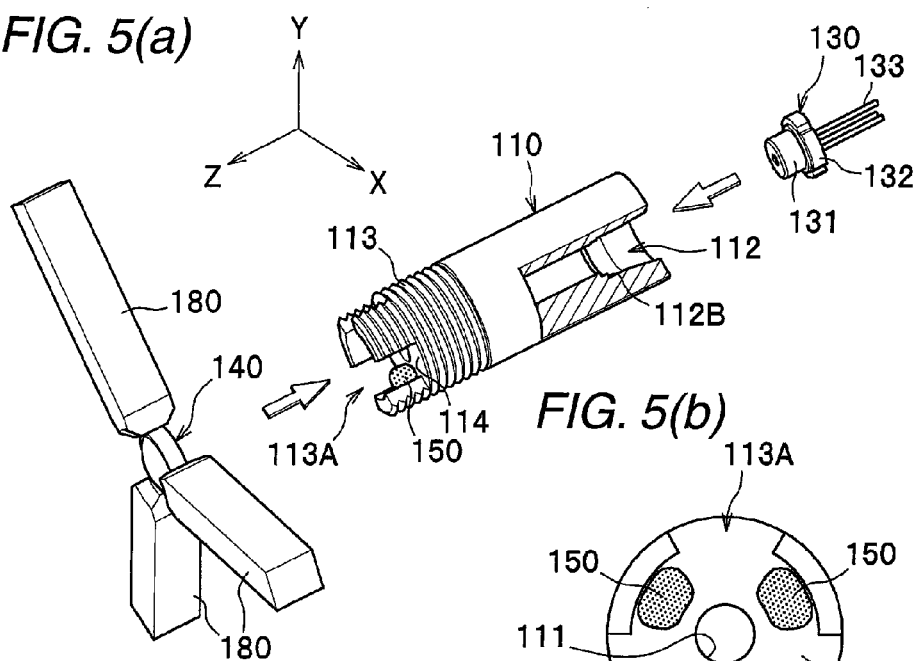
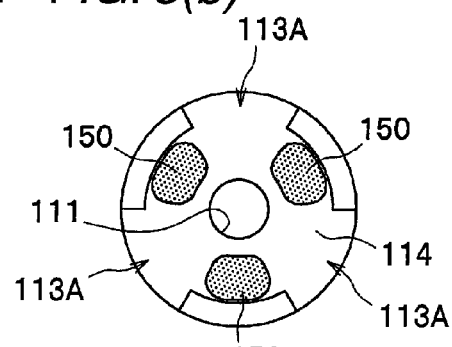
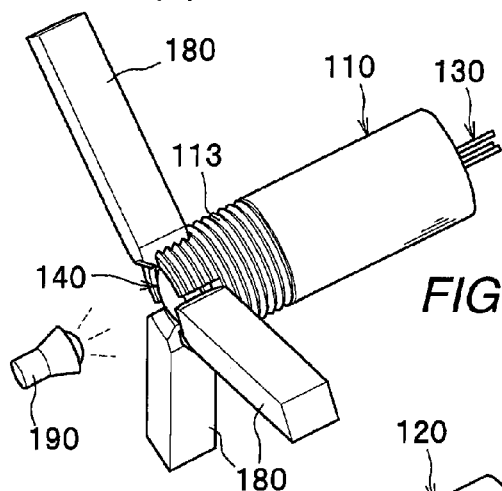
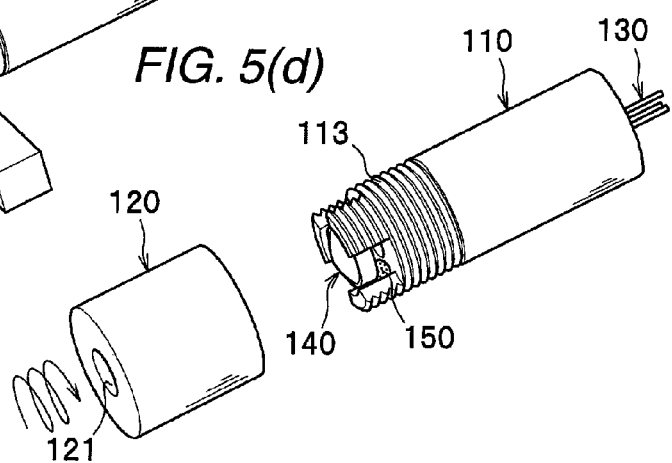

LIGHT SOURCE DEVICE AND MANUFACTURING METHOD THEREOF

CROSS REFERENCE TO RELATED APPLICATIONS

This application is a division of U.S. application Ser. No. 12/412,805, filed Mar. 27, 2009, which claims priority to Japanese Patent Application No. 2008-140811 filed on May 29, 2008. Each of these applications is hereby incorporated herein by reference in its entirety.

TECHNICAL FIELD

The present invention relates to a light source device used for an image forming apparatus and other apparatuses, and a manufacturing method thereof.

BACKGROUND ART

Generally, an electrographic image forming apparatus, such as a laser printer and a digital copying machine, uses an exposure unit that turns on and off a laser beam correspondingly to data of an image to be printed and scans a photosensitive member with this laser beam, thereby forming an electrostatic latent image on the photosensitive member.

The exposure unit includes a light source such as a laser diode, and a coupling lens (collimate lens). The coupling lens is disposed at the front of the laser diode for converting a laser light into a laser beam (in this specification, with respect to the light source device, an advancing direction in an optical-axis direction, i.e., downstream, is referred to as a "front").

In order to form an excellent image, the laser light needs to be converged into a small point on the exposure surface of the photosensitive member. Therefore, it is necessary to strictly determine a distance in an optical-axis direction between the laser diode and the coupling lens on the order of several μm to several hundreds of μm.

Thus, in order to strictly position the light source and the coupling lens, the position of the light source and the coupling lens is adjusted in two stages, i.e., a rough adjustment and a fine adjustment. For example, in an exposure unit disclosed in Patent Document 1, optical axes of a laser diode and a collimate lens are adjusted (i.e., the position in an X-Y direction orthogonal to the optical axis is aligned) with respect to each other, and in this state, both components, i.e. the laser diode and the collimate lens, are fixed to a holding member made of an aluminum plate. Thereafter, a portion of the aluminum plate holding the laser diode is deflected by feeding of a screw (see numeral 370 in FIG. 5) so as to finely adjust the position of the laser diode in the optical-axis direction (referred as a Z-direction).

Patent Document 1: Japanese Published Unexamined Patent Application No. 2004-163463 (FIGS. 5 and 6, U.S. Pat. No. 7,349,166)

In the method described in Patent Document 1, when the position of the laser diode is finely adjusted in the Z-direction by the feeding of the screw, the rotation force by which the screw is rotated may act on the aluminum plate holding the laser diode to misalign the optical axes of the light source and the coupling lens. Such misalignment of the optical axes enlarges aberration of a beam shaped by the coupling lens. This may result in a possibility that a laser beam cannot be converged into a desired small point.

SUMMARY

The present invention was made in view of the above-noted and/or other circumstances.

As one of illustrative, non-limiting embodiments, the present invention can provide a light source device including: a holding member; a light source held by the holding member; an optical element held by the holding member; and a hardened first adhesive agent bonding at least one of the light source and the optical element to the holding member. The hardened first adhesive agent has elasticity.

Accordingly, as one of advantages, the present invention can accurately position an optical element such as a coupling lens to a light source. This and other advantages of the present invention will be discussed in detail with reference to the accompanying drawings.

BRIEF DESCRIPTION OF THE DRAWINGS

FIGS. 5(a) to 5(d) are diagrams each describing an assembling step of the light source device, where FIG. 5(a) is an exploded perspective view before assembly; FIG. 5(b) is a diagram showing the arrangement of adhesive agents, where the light source device is seen from the front; FIG. 5(c) is a perspective view of a curing step of the adhesive agent; and FIG. 5(d) shows a perspective view of a step of finely adjusting the position of the coupling lens in the Z-direction.

FIG. 6(a) shows a position before the fine adjustment, and FIG. 6(b) shows a position after the fine adjustment.

FIG. 7(a) is an exploded perspective view of a cap assembly; FIG. 7(b) is a longitudinal sectional view showing a rough adjustment and a curing step; and FIG. 7(c) is a longitudinal sectional view showing a fine adjustment step.

FIG. 8(a) shows a longitudinal sectional view after the rough adjustment is ended; FIG. 8(b) shows a longitudinal sectional view when the adhesive agent is cured after the fine adjustment; and FIG. 8(c) shows a longitudinal sectional view after the fine adjustment is ended.

DESCRIPTION OF THE PREFERRED EMBODIMENT

First Embodiment

Figure 1:
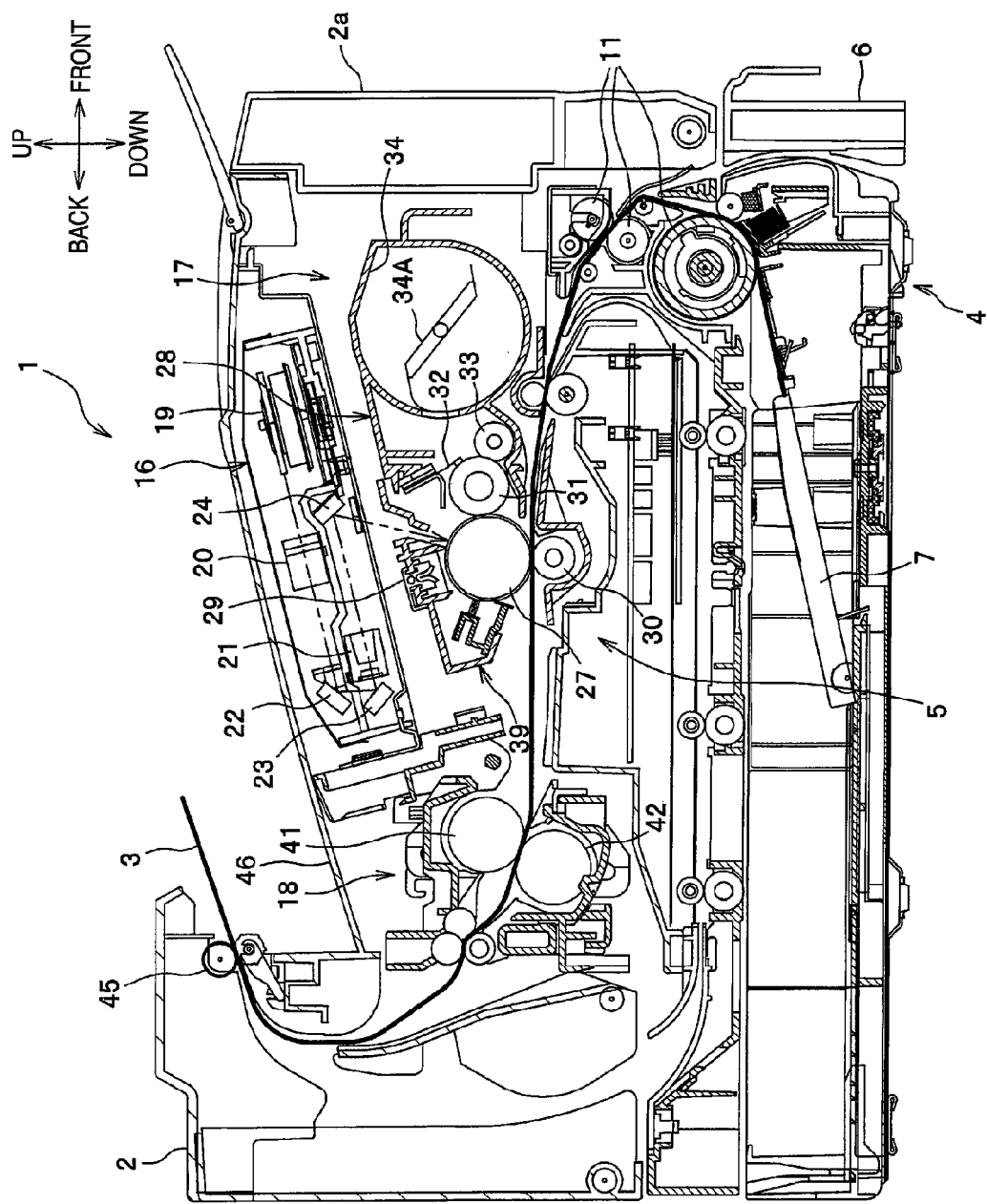
FIG. 1 is a sectional side view showing a laser printer provided with a light source device according to an exemplary embodiment of the present invention.
Figure 2:
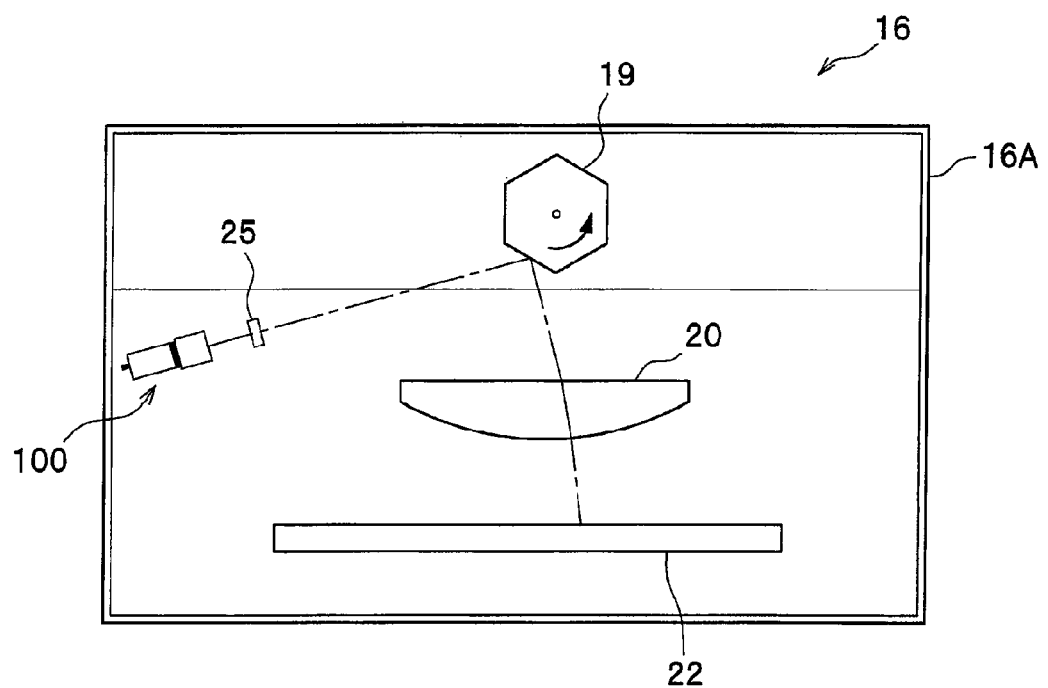
FIG. 2 is a plan view of a scanner unit.

Next, one exemplary embodiment of the present invention will be described in detail with reference to the drawings. In the drawings to be referenced, FIG. 1 is a sectional side view showing a laser printer provided with a light source device according to one embodiment of the present invention, and FIG. 2 is a plan view of a scanner unit. In order to describe a laser printer 1 below, there are adopted not only a front-back direction in the light source device, but also a direction with respect to a user at the time of using the laser printer 1. That is, in FIG. 1, the right side is referred to as a "front side;" the left side is referred to as a "back side;" out of the vertical direction of the drawing, the far side is referred to as a "right side;" and the near side thereof is referred to as a "left side." It is noted that the up-down direction is referred to as an "up-down direction" because the direction illustrated in the drawing matches a direction when the laser printer 1 is used by the user.

<Total Configuration of a Laser Printer>

As shown in FIG. 1, a laser printer 1 includes a casing 2, a feeder unit 4 for feeding a sheet 3, and an image forming unit 5 for forming an image on the sheet 3, for example.

<Configuration of the Feeder Unit>

The feeder unit 4 includes a feeder tray 6 removably mounted to the bottom within the casing 2, and a sheet press plate 7 arranged within the feeder tray 6. The feeder unit 4 further includes various rollers 11 for conveying the sheet 3 or capturing paper dust. The feeder unit 4 is configured so that the sheet 3 within the feeder tray 6 is upwardly urged by the sheet press plate 7, and conveyed to an image forming unit 5 by the various rollers 11.

<Configuration of the Image Forming Unit>

The image forming unit 5 includes a scanner unit 16 (as an example of an exposure unit), a process cartridge 17, a fixing part 18, etc.

<Schematic Configuration of the Scanner Unit>

The scanner unit 16 is arranged at an upper part in the casing 2, and as shown in FIG. 2, the scanner unit 16 includes a light source device 100, a cylindrical lens 25, a polygon mirror 19, an fθ lens 20, and a reflector 22. In order to correct an optical face tangle error of the polygon mirror 19, the cylindrical lens 25 narrows a laser beam from the light source device 100 in a sub-scanning direction before the laser beam is made incident on the polygon mirror 19. The polygon mirror 19, which has a mirror on each hexagonal side part, reflects the laser beam passing through the cylindrical lens 25 while being rotated to deflect and scan the laser beam in the main scanning direction. The fθ lens 20 converts the laser beam, scanned at an equiangular speed by the polygon mirror 19, so that the laser beam is scanned at an equal speed on the surface of a photosensitive drum 27 while being focused on the surface of the photosensitive drum 27.

The scanner unit 16 further includes a correction lens 21, and reflectors 23 and 24, as shown in FIG. 1, in order to orient the laser beam, oriented downwardly by the reflector 22, toward the photosensitive drum 27. Each of these members is appropriately installed to a case 16A (see FIG. 2).

The configuration of the light source device 100 will be described in detail later.

<Configuration of the Process Cartridge>

The process cartridge 17 can be mounted to and removed from the casing 2 when the front cover 2a at the front side of the casing 2 is open. The process cartridge 17 includes a developing cartridge 28 and a drum unit 39.

The developing cartridge 28 and the drum unit 39 mounted together are mountable to and removable from the casing 2 as a unit. Alternatively, the developing cartridge 28 per se may be mounted to and removed from the drum unit 39 fixed to the casing 2. The developing cartridge 28 includes a developing roller 31, a layer-thickness regulating blade 32, a supply roller 33, and a toner accommodating chamber 34.

In the developing cartridge 28, toner in the toner accommodating chamber 34 is stirred by an agitator 34A, and thereafter, supplied to the developing roller 31 by the supply roller 33. When supplied to the developing roller 31, the toner is positively charged by friction between the supply roller 33 and developing roller 31. As the developing roller 31 is rotated, the toner supplied onto the developing roller 31 enters between the layer-thickness regulating blade 32 and the developing roller 31, where the toner is carried on the developing roller 31 as a thin layer of a constant thickness while being further charged by friction.

The drum unit 39 includes a photosensitive drum 27, a scorotron-type charger 29, and a transfer roller 30. Within the drum unit 39, the surface of the photoconductor drum 27 is positively and uniformly charged by the scorotron-type charger 29, and thereafter, exposed by high-speed scanning of the laser beam from the scanner unit 16. Thereby, the potential in the exposed part is decreased, and an electrostatic latent image based on image data is formed.

Next, as the developing roller 31 is further rotated, the toner carried on the developing roller 31 is supplied to the electrostatic latent image formed on the surface of photoconductor drum 27, and thereby, a toner image is formed on the surface of photoconductor drum 27. Thereafter, the sheet 3 is conveyed between the photoconductor drum 27 and the transfer roller 30, and as a result, the toner image carried on the surface of photoconductor drum 27 is transferred on the sheet 3.

<Configuration of the Fixing Part>

The fixing part 18 includes a heating roller 41 and a pressure roller 42, arranged opposite the heating roller 41, for pressurizing the heating roller 41. With the thus configured fixing part 18, the toner transferred onto the sheet 3 is fixed thermally while the sheet 3 passes between the heating roller 41 and the pressure roller 42. The sheet 3 having the toner image thermally fixed thereon is conveyed to a sheet discharge roller 45 disposed downstream of the fixing part 18, and is fed onto a sheet discharge tray 46 from the sheet discharge roller 45.

<Configuration of the Light Source Device>

Figure 3:
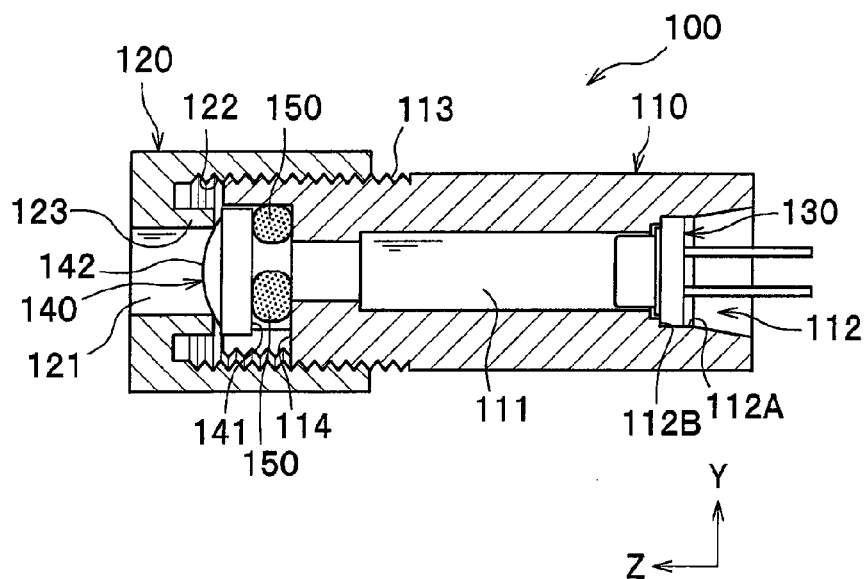
FIG. 3 is a longitudinal sectional view of the light source device.
Figure 4:
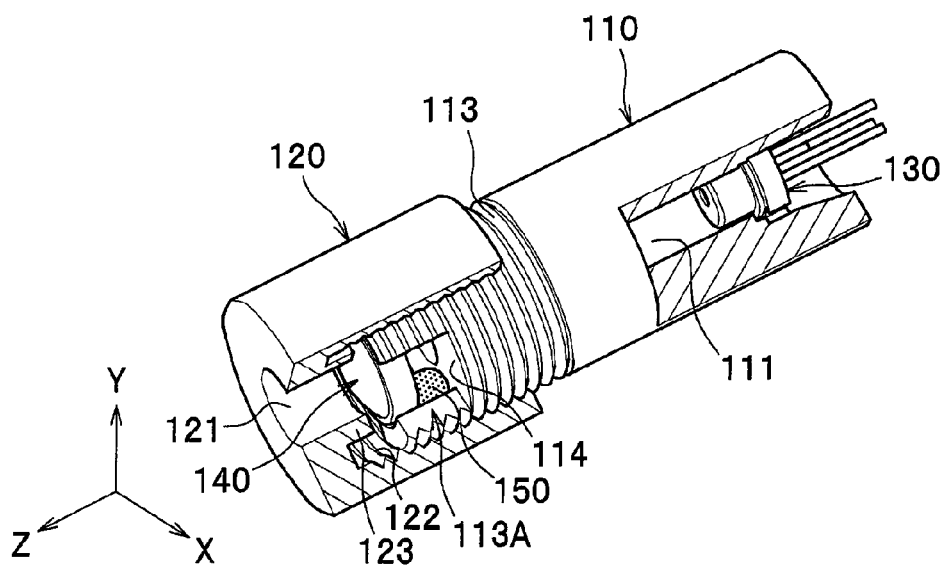
FIG. 4 is a partially-cutaway perspective view of the light source device.

FIG. 3 is a longitudinal sectional view of the light source device, and FIG. 4 is a partially-cutaway perspective view of the light source device. FIGS. 5(a) to 5(d) are diagrams each describing an assembling step of the light source device. FIG. 5(a) is an exploded perspective view before assembly; FIG. 5(b) is a diagram showing the arrangement of adhesive agents, where the light source device is seen from the front; FIG. 5(c) is a perspective view of a curing step of the adhesive agent; and FIG. 5(d) shows a perspective view of a step of finely adjusting the position of the coupling lens in the Z-direction.

As shown in FIG. 3, a light source device 100 is configured so that a holding member 110 holds a laser diode 130 and a coupling lens 140 and the position of the coupling lens 140 relative to the laser diode 130 is adjusted by a cap 120.

The holding member 110 is a cylindrical member made by machining aluminum, etc., and is formed with an optical-path hole 111 having a central axis on which a laser light passes. At one end portion (regarded as a back end portion because for the laser light, this is the upstream side) of the optical-path hole 111, the holding member 110 is formed with a laser attaching portion 112 into which the laser diode 130 is press-fitted. At the other end portion (front end portion) thereof, the holding member 110 is formed with a lens bonded surface 114 to which the coupling lens 140 is bonded. The laser attaching portion 112 has a cylindrical surface 112A corresponding to the outer diameter of the laser diode 130 and an abutment surface 112B that is a surface of a stepped portion reduced in diameter at the front end of the cylindrical surface 112A. The abutment surface 112B is used for positioning the laser diode 130 in the Z-direction, i.e., the optical-axis direction, by abutting the laser diode 130 against the abutment surface 112B when the laser diode 130 is press-fitted. The lens bonded surface 114 is orthogonal to the Z-direction of the holding member 110.

The outer circumference of the holding member 110 is formed with a male screw 113 in a predetermined range from the front end. As shown in FIG. 4 and FIG. 5(b), the front end portion of the holding member is formed with three notches 113A at equal intervals in the circumferential direction. Each notch 113A is a part into which a chuck 180 for grasping the coupling lens 140 enters when bonding the coupling lens 140 to the holding member 110 (see FIGS. 5(a) and 5(c)).

The laser diode 130 is an element that emits a laser light at a slightly divergent angle. As shown in FIG. 5(a), the laser diode 130 has a main body 131, a collar 132, and an electrical terminal 133, and is press-fitted in the laser attaching portion 112 of the holding member 110, as described above.

The coupling lens 140 is a lens for converging light radiated from the laser diode 130 and for converting the light into a beam. As shown in FIG. 3, the coupling lens 140 is formed so that its back surface 141 is planar and its front surface 142 is convex. The coupling lens 140 is bonded to the lens bonded surface 114 of the holding member 110 with a first adhesive agent 150.

The first adhesive agent 150 is an adhesive agent having elasticity after being cured. Examples of the first adhesive agent 150 include an adhesive agent having an elastic modulus after being hardened or cured on the order of several MPa to several hundreds of MPa. The level of elasticity of the first adhesive agent 150 may be so strong in elastic deformation to the extent that after the first adhesive agent 150 is hardened, the position of the coupling lens 140 in the Z-direction can be finely adjusted. The level may be selected according to a light source device to be specifically manufactured and a production facility therefor. Examples of the first adhesive agent 150 may include an adhesive agent which can elastically deform on the order of several μm to several hundreds of μm in terms of an amount of elastic deformation. In consideration of the ease of manufacture, it is desired to use, as the first adhesive agent 150, a light curable resin that is cured by the irradiation of a curing light.

The cap 120 is a cylindrical member that is threadedly engaged with the front end of the holding member 110 from the external side, and has a light-emitting hole 112 having the central axis, on which the beam converted by the coupling lens 140 passes. Further, the inner circumference of the cap 120 is formed with a female screw 122 threadedly engaged with the male screw 113 of the holding member 110. The edge portion of the light-emitting hole 121 forms a projection 123, extending toward the rear side, for fine adjustment of the coupling lens 140.

In the assembled light source device 100, the coupling lens 140 that is bonded to the holding member 110 is pressed in the Z-direction (optical-axis direction) within an elastic range of the cured first adhesive agent 150, and fixed to the holding member 110 in a state that a distance between the laser diode 130 and the coupling lens 140 is finely adjusted.

<Manufacturing Method of the Light Source Device>

Next, the manufacturing method of the aforementioned light source device 100 is described.

As shown in FIG. 5(a), the laser diode 130 is press-fitted in the holding member 110 from the back end. More specifically, the laser diode 130 is press-fitted until the collar 132 abuts against the abutment surface 112B of the holding member 110. As a result, the position of the laser diode 130 in the Z-direction is determined relative to the holding member 110.

Next, by using an adhesive-agent applying device (not shown), the first adhesive agent 150 is applied on the lens bonded surface 114 of the holding member 110 while avoiding the notches 113A as shown in FIG. 5(b). In this embodiment, a light curable resin is used as the first adhesive agent 150.

Thereafter, as shown in FIGS. 5(a) and 5(c), the outer circumferential edge of the coupling lens 140 is grasped from three directions by the 3-jaw chuck 180, and the coupling lens 140 is brought closer to the lens bonded surface 114 of the holding member 110. Next, the laser diode 130 is turned on to emit light, and the position of the coupling lens 140 in an X-Y direction is determined while measuring a state of the light that has passed through the coupling lens 140. That is, the optical axis of the laser diode 130 and that of the coupling lens 140 are aligned. Concurrently, the position of the coupling lens 140 in the Z-direction is also roughly adjusted. In this rough adjustment, the position of the coupling lens 140 is adjusted such that a distance between the laser diode 130 and the coupling lens 140 after this rough adjustment is larger than a distance between the laser diode 130 and the coupling lens 140 positioned at a final target position in the Z-direction. This is because the position of the coupling lens 140 in the Z-direction can be finely adjusted after this rough adjustment by moving the coupling lens 140 toward the laser diode 130 with the cap 120.

When the rough adjustment of the position of the coupling lens 140 while moving the chuck 180 is completed, the chuck 180 is stopped. Then, the first adhesive agent 150 is irradiated with an ultraviolet ray (curing rays) by an ultraviolet lamp 190 for curing. In this way, the coupling lens 140 is bonded and fixed to the holding member 110 with the first adhesive agent 150, as shown in FIG. 5(d).

Figure 6A:
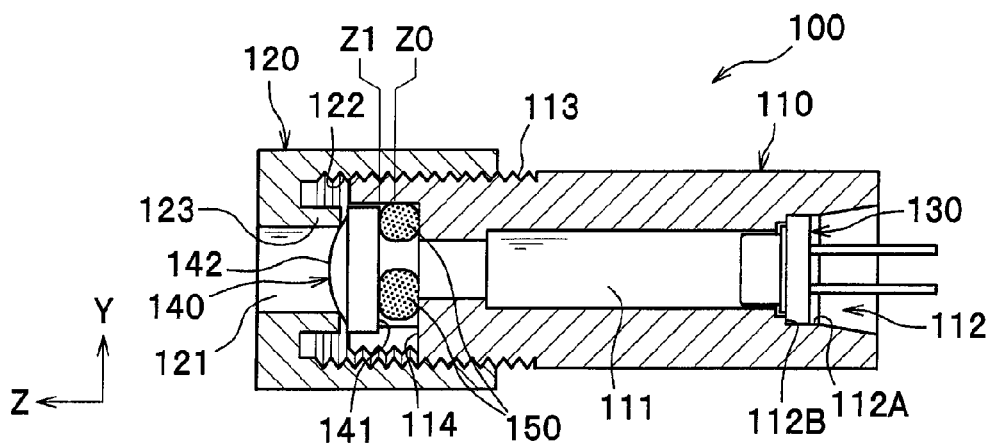
FIGS. 6(a) and 6(b) are longitudinal sectional views each describing a step of fine adjustment of a position of a coupling lens in a Z-direction, where
Figure 6B:
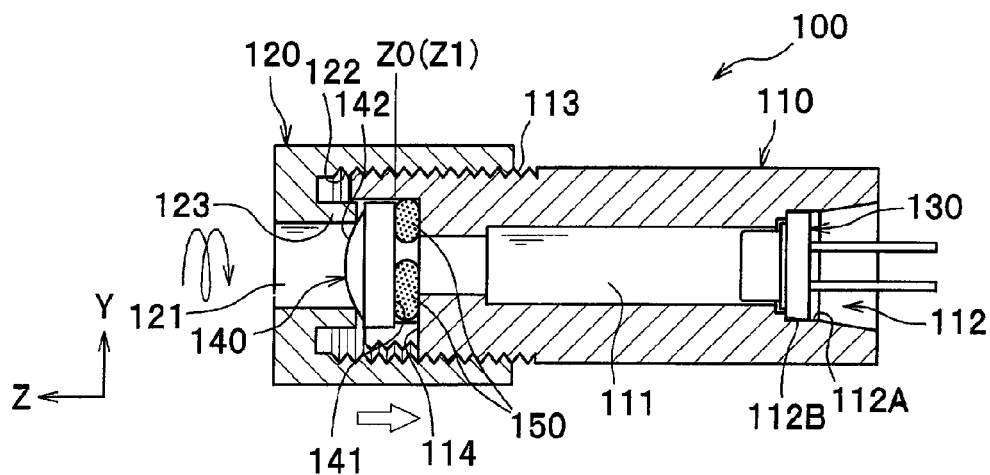

Next, the cap 120 is threadedly engaged with the male screw 113 of the holding member 110 (see FIG. 5(d)) so as to finely adjust the position of the coupling lens 140 in the Z-direction. FIGS. 6(a) and 6(b) are longitudinal sectional views each showing a step of fine adjustment of the position of the coupling lens 140 in the Z-direction. FIG. 6(a) shows a position before the fine adjustment, and FIG. 6(b) shows a position after the fine adjustment.

As shown in FIG. 6(a), a position Z1 of the back surface 141 of the coupling lens 140 in the Z-direction and a position Z0 at which the back surface 141 should be located are offset before the fine adjustment. More specifically, the position Z0 is located backwardly of the position Z1. It is noted that the aforementioned target position is a design position based on the assumption of this position Z0.

As shown in FIG. 6(b), when the cap 120 is screwed to the holding member 110, the projection 123 contacts the front surface 142 of the coupling lens 140, thereby pushing the coupling lens 140 backwards. The first adhesive agent 150, which is pushed by the coupling lens 140, is deformed within a range of its elasticity. The laser diode 130 is turned on to emit light while threadedly moving the cap 120 backwards, and the convergence of the laser beam by the coupling lens 140 is measured by using optical elements, such as another lens, placed at a predetermined position (not shown). When the laser beam can be converged at one point, the screwing of the cap 120 to the holding member 110 is ended. Accordingly, the position Z1 of the back surface 141 can be identical to the position Z0.

As described above, the positions of each direction, i.e., X-, Y-, and Z-directions, of the coupling lens 140 relative to the holding member 110 are determined That is, the positions of the coupling lens 140 in each direction, i.e., X-, Y- and Z-directions, relative to the laser diode 130 are also determined.

In this positioning process, the coupling lens 140 is bonded to the holding member 110 with the first adhesive agent 150, and thereby, an approximate position of the coupling lens 140 relative to the laser diode 130 is finalized. Thereafter, the final position of the coupling lens 140 is finely adjusted by utilizing the elasticity of the first adhesive agent 150. Therefore, during the final fine adjustment, the coupling lens 140 is not located at any unexpected position due to unintended movement. Thus, the laser diode 130 and the coupling lens 140 can be positioned accurately with each other.

Further, the optical axes of the laser diode 130 and the coupling lens 140 are aligned relative to each other and the approximate position in the Z-direction is also adjusted by the rough adjustment. Thus, only the distance between the laser diode 130 and the coupling lens 140 is adjusted by the fine adjustment. During this fine adjustment, the coupling lens 140 is substantially restrained by the first adhesive agent 150 in the X-Y direction. Thus, when the coupling lens 140 is moved in the Z-direction only, the accurate positioning is enabled.

Also, the rough adjustment is carried out such that a distance between the laser diode 130 and the coupling lens 140 is larger than a preliminarily determined target distance between the laser diode 130 and the coupling lens 140. Therefore, when the cap 120 is fed in the backward direction by the final fine adjustment, it reaches the target position any way. Thus, the fine adjustment step can be performed efficiently.

In addition, the light source device 100 of the present embodiment uses the cap 120 that contacts the coupling lens 140 and that is threadedly engaged with the holding member 110 to advance and retract in the optical-axis direction. Thus, the final fine adjustment can be performed with a simple method, i.e., the rotation of the cap 120.

Second Embodiment

Figure 7A:
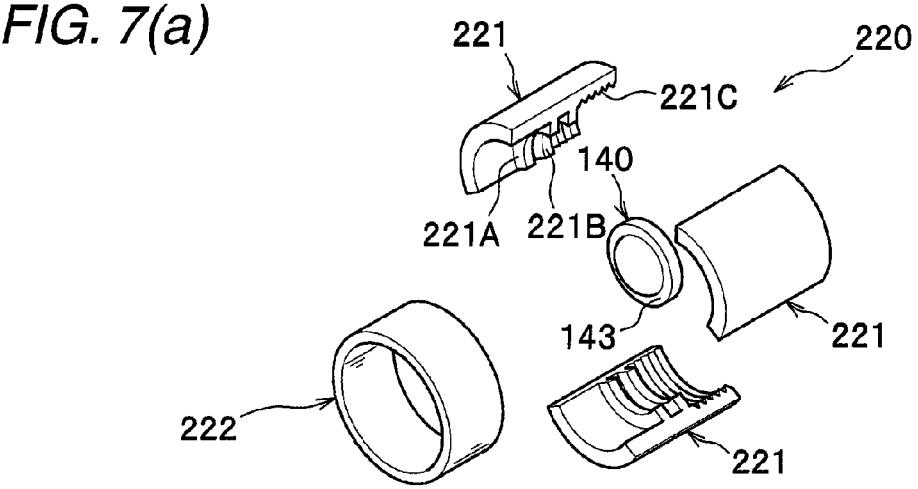
FIGS. 7(a) to 7(c) are diagrams each describing a light source device of a second exemplary embodiment, where
Figure 7B:
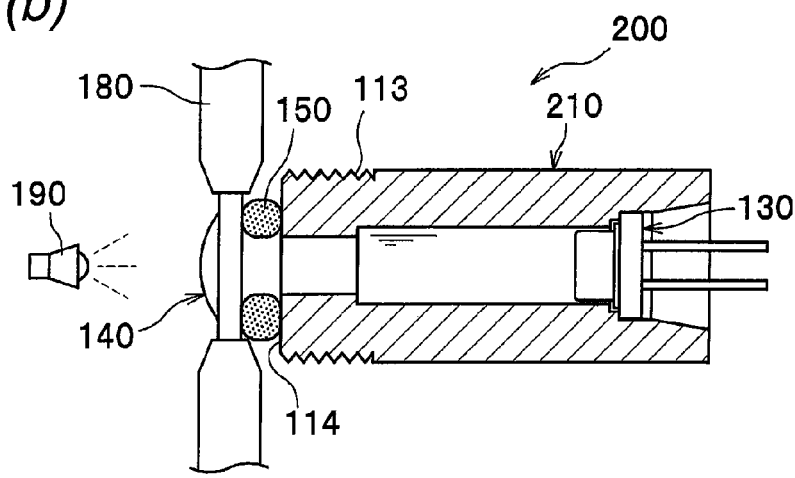
Figure 7C:
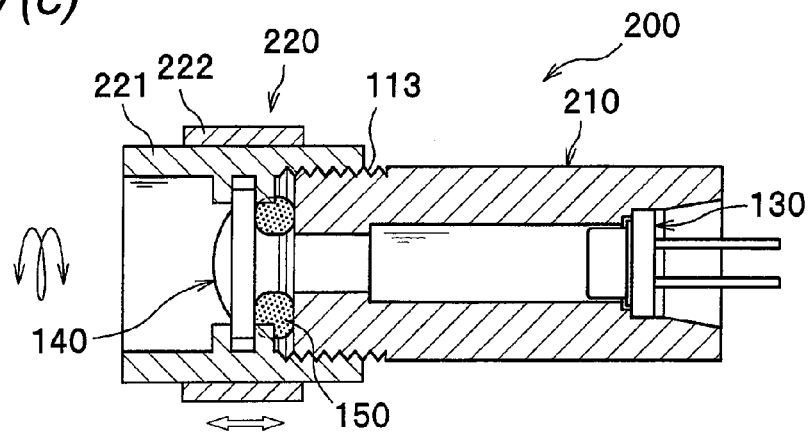

Next, a second exemplary embodiment of the present invention will be described. In the referenced figure, FIGS. 7(a) to 7(c) are diagrams each describing a light source device of the second embodiment. FIG. 7(a) is an exploded perspective view of a cap assembly, FIG. 7(b) is a longitudinal sectional view showing a rough adjustment and a curing step, and FIG. 7(c) is a longitudinal sectional view showing a fine adjustment step. It is noted that in each of the following embodiments, the points that are different from those in the first embodiment will mainly be described, and the same elements are assigned the same numerals.

A light source device 200 according to the second embodiment is configured such that the coupling lens 140 can move in both directions, i.e., a front-back direction, to perform fine adjustment. As shown in FIG. 7(a), the cap assembly 220 used in the light source device 200 of the second embodiment includes split-type lens holders 221 (three split parts) and a ring 222. Each split-type lens holder 221 has a shape obtained by splitting a cylinder in three parts in a circumferential direction, and has on its inner circumference two ribs 221A and 221B that protrude in a radius direction. The interval between the ribs 221A and 221B is set to correspond to the thickness of an outer circumferential edge portion 143 of the coupling lens 140. Accordingly, the edge portion 143 can be inserted between and fixed by the ribs 221A and 221B. The back end portion on the inner circumference of the cap assembly 220, similar to the cap 120 of the first embodiment, is formed with a female screw 221C threadedly engaged with the male screw 113 of the holding member 110.

The three split-type lens holders 221 are integrated after the outer circumferential edge portion 143 of the coupling lens 140 is inserted between the ribs 221A and 221B. The outside of the integrated lens holders 221 is fitted with the ring 222, thereby configuring the integrated cap assembly 220.

The light source device 200 according to the second embodiment is assembled as follows: First, as shown in FIG. 7(b), the first adhesive agent 150 is applied to the lens bonded surface 114 of the holding member 210, and the coupling lens 140 is grasped by the chuck 180, which is brought close to the lens bonded surface 114. In this state, the position of the coupling lens 140 is roughly adjusted. In a state that the rough adjustment is completed, an ultraviolet ray is irradiated by the ultraviolet lamp 190, thereby curing the first adhesive agent 150.

Thereafter, as shown in FIG. 7(c), the split-type lens holders 221 are assembled together so that the outer circumferential edge portion 143 of the coupling lens 140 is inserted between the ribs 221A and 221B of the three split-type lens holders 221. The outside of the split-type lens holders 221 that has a cylindrical shape as a result of being assembled together is fitted with the ring 222. The assembled cap assembly 220 is rotated relative to the holding member 110, and thereby, the cap assembly 220 is moved in the front-back direction relative to the holding member 110.

The cap assembly 220 in this embodiment has the ribs 221A and 221B at the front and back of the coupling lens 140, respectively, at the stage of the fine adjustment shown in FIG. 7(c). Thus, depending on the direction into which the cap assembly 220 is rotated relative to the holding member 110, the coupling lens 140 can be moved both forwardly and backwardly of the laser diode 130. As a result, at the step of the rough adjustment, even when the coupling lens 140 is deviated either forwardly or backwardly of the target position, the position of the coupling lens 140 in the Z-direction can be finely adjusted.

Third Embodiment

Figure 8A:
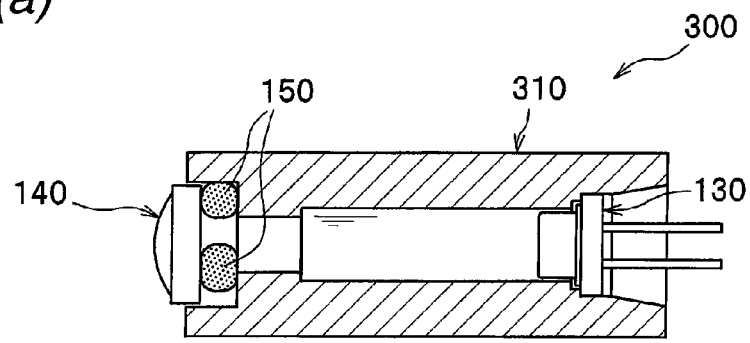
FIGS. 8(a) to 8(c) are diagrams each describing a light source device of a third exemplary embodiment, where
Figure 8B:
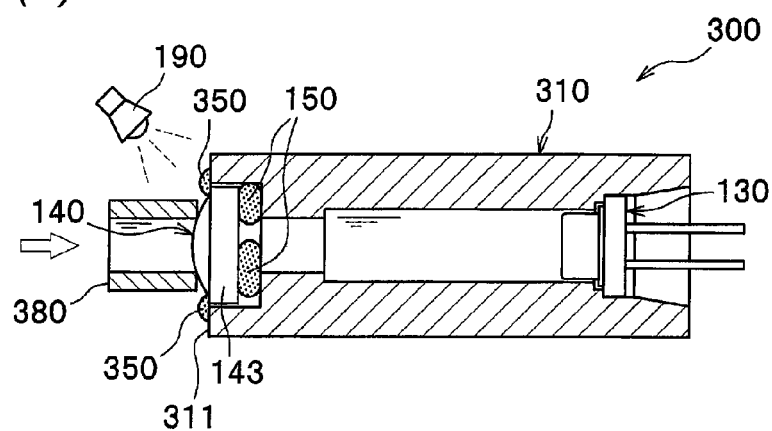
Figure 8C:
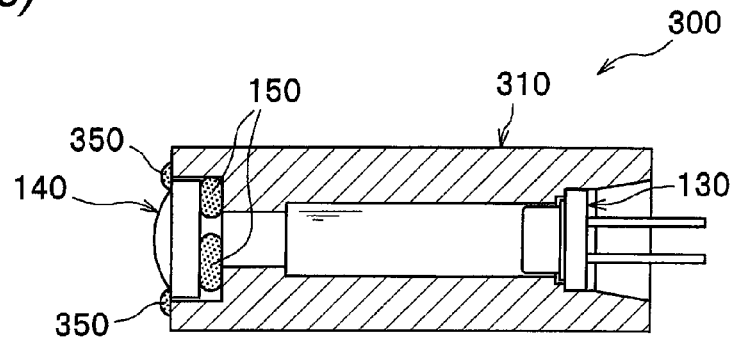

Next, a third exemplary embodiment of the present invention will be described. In the referenced figure, FIGS. 8(a) to 8(c) are diagrams each describing a light source device of the third embodiment. FIG. 8(a) shows a longitudinal sectional view after the rough adjustment is ended, FIG. 8(b) shows a longitudinal sectional view when the adhesive agent is cured after the fine adjustment, and FIG. 8(c) shows a longitudinal sectional view after the fine adjustment is ended. In the third embodiment, a case that after the fine adjustment of the coupling lens 140, the position of the coupling lens 140 is further fixed with the adhesive agent is described.

As shown in FIG. 8(a), similar to the first embodiment, the light source device 300 according to the third embodiment is assembled such that the position of the coupling lens 140 is roughly adjusted after the laser diode 130 is press-fitted in the holding member 310, and then, the coupling lens 140 is bonded to the holding member 310 with the first adhesive agent 150.

Thereafter, as shown in FIG. 8(b), the coupling lens 140 is pushed backwards by a jig 380 for fine adjustment of a lens position, and the position of the coupling lens 140 is finely adjusted within a range of an elastic deformation of the first adhesive agent 150. After the fine adjustment is completed, a second adhesive agent 350, which is a light curable resin, is applied across the front end surface 311 of the holding member 310 and the outer circumferential edge portion 143 of the coupling lens 140. For the second adhesive agent 350, an adhesive agent of which the elastic modulus after being cured is higher than that of the first adhesive agent 150 after being cured is used. Further, the second adhesive agent 350 is irradiated with an ultraviolet ray by the ultraviolet lamp 190 so as to cure the second adhesive agent 350.

As described above, when the second adhesive agent 350 is cured, the coupling lens 140 is positioned in the Z-direction in a state that the first adhesive agent 150 is elastically deformed, as shown in FIG. 8(c). The second adhesive agent 350 is higher in elastic modulus after being cured than the first adhesive agent 150. Thus, the deformation of the second adhesive due to the elastic force of the first adhesive agent 150 is small, and the position of the coupling lens 140 relative to the holding member 310 can be fixed. From this viewpoint, the higher the elastic modulus after being cured in the second adhesive agent 350, the more desirable.

By fixing the coupling lens 140 with the second adhesive agent 350 as in this embodiment, the step of the fine adjustment can be performed on the same production line as that of the rough adjustment by the first adhesive agent 150.

Although the embodiments of the present invention have been described above, the present invention is not limited to the aforementioned embodiments and can be appropriately modified and implemented.

Figure 9:
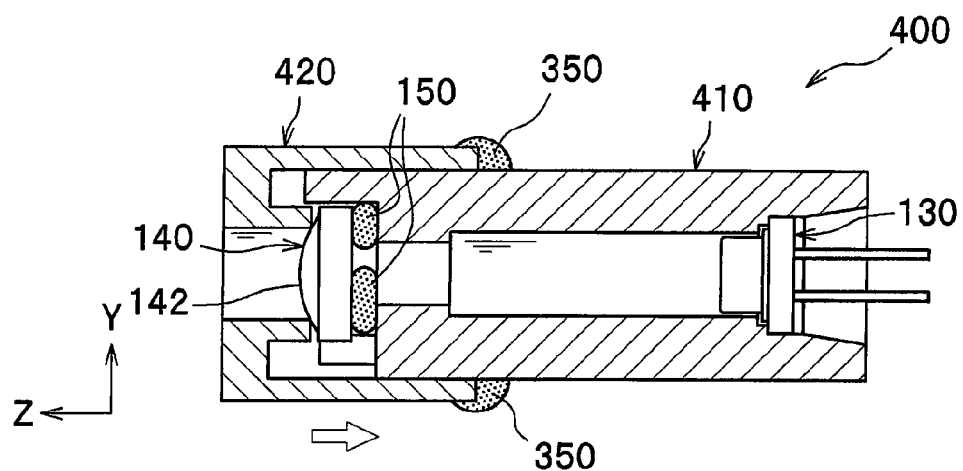
FIG. 9 is a cross sectional view of a light source device according to a first modification of the third embodiment.

For example, the coupling lens 140 and the holding member 310 are bonded with the second adhesive agent 350 in the third embodiment. However, as in a light source device 400 shown in FIG. 9, a cap 420 that is fitted slidably only, rather than being threadedly engaged by a screw, to the holding member 410, is arranged, the cap 420 is used to press the coupling lens 140 for the fine adjustment, and thereafter, with the second adhesive agent 350, the cap 420 and the holding member 410 may be bonded.

Figure 10:
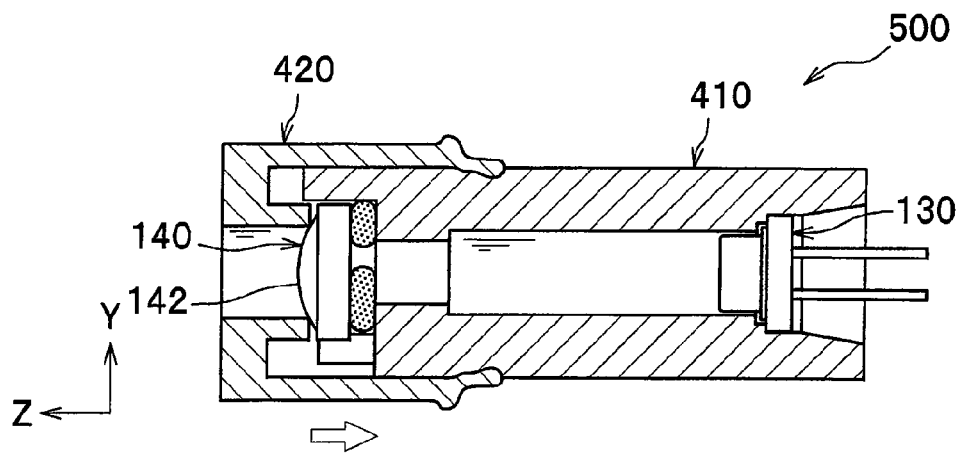
FIG. 10 is a cross sectional view of a light source device according to a second modification of the third embodiment.

Moreover, instead of bonding the cap 420 and the holding member 410 with an adhesive agent, these components can also be fixed through adhesion such as spot welding as shown in FIG. 10.

In the aforementioned embodiments, the holding member 110 and the coupling lens 140 are bonded with the first adhesive agent 150. However, the laser diode 130 and the holding member 110 may be bonded with the first adhesive agent 150, and at the step of fine adjustment, the position of the laser diode 130 relative to the holding member 110 may be adjusted. Moreover, both the laser diode 130 and the coupling lens 140 may be bonded to the holding member 110 with the first adhesive agent 150.

In the aforementioned first embodiment, the rough adjustment is performed so that the coupling lens 140 is set at a position that is further than the target distance between the laser diode 130 and the coupling lens 140. However, the coupling lens 140 may also be set at a nearer position.

In the aforementioned embodiments, the laser printer 1 is illustrated as an example of an apparatus in which the light source device is arranged, the laser diode 130 is illustrated as the light source, and the coupling lens 140 is illustrated as the optical element. However, there is no limitation to these.

As discussed above, the present invention can provide at least the following illustrative, non-limiting embodiments:

(1) A method of manufacturing a light source device, the light source device including: a light source; an optical element for converting light radiated from the light source into a desired beam; and a holding member for holding the light source and the optical element, the manufacturing method including a step of bonding at least one of the light source and the optical element to the holding member with a first adhesive agent having elasticity after being cured.

(2) A light source device including: a light source; an optical element for converting light radiated from the light source into a desired beam; and a holding member for holding the light source and the optical element, wherein at least one of the light source and the optical element is bonded to the holding member with a first adhesive agent having elasticity after being cured.

According to the manufacturing method of (1) and the light source device of (2), when at least one of the light source and the holding member is bonded to a holding member with a first adhesive agent, an approximate positional relationship between the light source and the optical element can be finalized. Further, since the first adhesive agent has elasticity after being cured, the positional relationship of the light source and the optical element can be finely adjusted within a range of deformation caused by the elasticity. Thus, it is possible to accurately position the light source and the optical element with each other.

What is claimed is:

1. A light source device, comprising:
    a hold member;
    a light source held by the hold member;
    a coupling lens held by the hold member; and
    a hardened first adhesive agent bonding the coupling lens to the hold member, the hardened first adhesive agent having elasticity and provided between the light source and the coupling lens in an optical-axis direction;
    a hardened second adhesive agent bonding the coupling lens to the hold member, the hardened second adhesive agent being higher in elastic modulus than the hardened first adhesive agent and provided at an opposite side to the first adhesive agent with respect to the coupling lens while interposing the coupling lens between the first adhesive agent and the second adhesive agent.

2. The light source device according to claim 1, wherein coupling lens, bonded to the hold member is biased in the optical-axis direction within an elastic range of the hardened first adhesive agent to maintain a finely adjusted distance between the light source and the coupling lens.

3. A light source device comprising:
    a hold member;
    a light source held by the hold member;
    a coupling lens held by the hold member;
    a hardened first adhesive agent bonding the coupling lens to the hold member, the hardened first adhesive agent having elasticity and provided between the light source and the coupling lens in an optical-axis direction;
    an adjusting member including a contact part which is provided at an opposite side to the first adhesive agent with respect to the coupling lens while interposing the coupling lens between the contact part and the first adhesive agent, and which contacts the coupling lens to bias the coupling lens toward the light source such that the first adhesive agent is elastically deformed; and
    a hardened second adhesive agent bonding the adjusting member to the hold member, the hardened second adhesive agent being higher in elastic modulus than the hardened first adhesive agent.

4. The light source device according to claim 3, wherein the adjusting member has a screw portion threadedly engaged with the hold member so as to allow the coupling lens to advance and retract in the optical-axis direction.

5. The light source device according to claim 3, wherein the adjusting member is welded to the hold member.

* * * * *